(12) United States Patent  (10) Patent No.: US 8,096,252 B2
Huang  (45) Date of Patent: Jan. 17, 2012

(54) SHIP HULL STRUCTURE AND A METHOD OF OPERATING THE SHIP

(76) Inventor: Bill Wen-Chang Huang, Taipei (TW)

( * ) Notice: Subject to any disclaimer, the term of this patent is extended or adjusted under 35 U.S.C. 154(b) by 108 days.

(21) Appl. No.: 12/499,336

(22) Filed: Jul. 8, 2009

(65) Prior Publication Data

US 2010/0064959 A1    Mar. 18, 2010

(30) Foreign Application Priority Data

Sep. 16, 2008  (TW) .............................. 97135458 A

(51) Int. Cl.
*B63B 1/38* (2006.01)

(52) U.S. Cl. .................................... 114/67 A; 114/77 R

(58) Field of Classification Search ................ 114/67 A, 114/77 A, 77 R, 248, 249, 352
See application file for complete search history.

(56) References Cited

U.S. PATENT DOCUMENTS

| | | | | |
|---|---|---|---|---|
| 2,747,536 | A * | 5/1956 | Russell | 114/77 R |
| 3,145,681 | A | 8/1964 | Nakagawa | |
| 3,370,564 | A | 2/1968 | Archer et al. | |
| 4,050,395 | A | 9/1977 | Anderson | |
| 6,431,099 | B1 | 8/2002 | Huang | |
| 6,609,472 | B2 * | 8/2003 | Burg | 114/67 A |
| 7,845,297 | B2 * | 12/2010 | Keck | 114/67 A |

* cited by examiner

*Primary Examiner* — Lars A Olson
(74) *Attorney, Agent, or Firm* — Wenderoth, Lind & Ponack, L.L.P.

(57) ABSTRACT

A ship hull structure includes a main hull and a movable rearbody having an engine and a propeller. The movable rearbody is located at a lower side of a stern of the main hull, connected with an aft of the main hull to form an integral unit by a hinge linking device allowing the rearbody to pivot up and down. By a block, a crane or a winch and through a chain or a hanging wire, a pivoting angle of the movable rearbody with respect to the main hull can be adjusted and controlled. A bottom of the hull can be provided with at least one, usually plural, air cushion recess, which is filled with pressurized air to reduce a viscous force between a bottom of the ship and water.

6 Claims, 5 Drawing Sheets

SHIP HULL STRUCTURE AND A METHOD OF OPERATING THE SHIP

BACKGROUND OF THE INVENTION a) Field of the Invention

The present invention relates to a ship, and more particularly to a ship hull which is provided with a main hull and a movable rearbody having an engine and a propeller, with the movable rearbody being pivoted at a stern of the main hull by a hinge coupling device that the rearbody is able to move upward and downward with respect to the main hull.

b) Description of the Prior Art

A ship hull is divided into a fore and aft hull sections, and confronting ends of the fore and aft hull sections are connected as an integral unit by a hinge coupling device to constitute an articulated ship, such as U.S. Pat. Nos. 3,145,681 (issued to ETSUO NAKAGAWA), 3,370,564 (issued to G. ARCHER, et al.), 4,050,395 (issued to ANDERSON) and 6,431,099 (issued to HUANG, the present inventor). All the design objects of these articulated ship structures are to increase a capability of the hulls to overcome hogging and sagging resulted from pitching which occurs when the ships ride on waves during sailing.

U.S. Pat. No. 3,145,681 discloses that a hinge coupling portion of two hull sections is formed by at least one half-cylindrical projection of one hull section, at least one half-cylindrical concave portion of the other hull section to engage with the half-cylindrical projection, and transversal shafts which penetrate center portions of the projections and the concave portions that are engaged, thereby connecting the two hull sections as one integral unit with one hull section being rotatable relative to the other hull section.

U.S. Pat. No. 3,370,564 discloses a structural improvement to the hinge coupling device as described in the aforementioned U.S. Pat. No. 3,145,681 by increasing a radius of the hinge coupling device to give greater bending relationship to the hull sections and to extend an arc below a base line of the ship.

U.S. Pat. No. 4,050,395 discloses a hinge coupling device which is applied to the aforementioned articulated ship. However, this hinge coupling device is different from the aforementioned hinge coupling devices by being provided with a pivot means which interconnects the fore and aft hull sections for relative pivoting, and a connecting means which is away from the pivot means and is used to interconnect the two hull sections to adjustably yieldingly resist a relative angular displacement of the hull sections, with the pivot means including an adjustment means for adjustably vertically shifting one section relative to the other section.

U.S. Pat. No. 6,431,099 issued to the present inventor discloses a hinge coupling device which is applied to the aforementioned articulated ship. The hinge coupling device includes a hinge block which forms part of the ship hull, and an interior of which is provided with a complete hinge assembly. This hinge block is constituted by a hull-type front hinge portion, a hull-type rear hinge portion and the aforementioned hinge assembly which is pivotally provided between the front and rear hinge portions to connect these two hinge portions, wherein one hinge portion is detachably connected to one of the fore and aft hull sections, and the other hinge portion is fixed at the other one of the fore and aft hull sections. By this structure, the fore and aft hull sections which are connected as one integral body can be separated when necessary.

The articulated ship structures disclosed in the aforementioned patents are provided with one common function to reduce a bending moment that acts on the hull from pitching which occurs when the ship rides on waves. In other words, this common function is to increase resistance of the hull to the hogging and sagging resulted from the waves. However, these patents never disclose nor imply that when this kind of articulated ship sets sail or navigates, the rearbody can be lifted up or put down by a hoisting method to adjust a pitching angle with respect to the forebody, thereby adjusting a propeller at a desired waterline height or setting the propeller to sway in the adjusted pitching angle.

Moreover, for the aforementioned conventional articulated ship structure, the hinge coupling device of the fore and aft hull sections is directly exposed outside, which is indecent to be looked at and is dangerous.

SUMMARY OF THE INVENTION

The primary object of the present invention is to provide an articulated ship hull structure which includes a main hull and a movable rearbody pivoted at a rear part of the main hull by a hinge coupling device that the rearbody can move upward and downward with respect to the main hull. An interior of the movable rearbody is provided with engines and propellers which are extended out of the hull through propeller shafts from the engines and the rearbody can be ascended or descended by an ascending device such as a winch or a block, to adjust and control an upward and downward pivot angle with respect to the main hull.

A second object of the present invention is to provide an articulated ship hull structure, wherein a flat bottom of the main hull is provided with at least one row of at least one, usually plural, air cushion recess which is filled with pressurized air during sailing to reduce a viscosity force between the ship bottom and water, thereby increasing a sailing speed and decreasing loss of horsepower.

A third object of the present invention is to provide an articulated ship hull structure, wherein a stern portion of the main hull forms a cavity portion which is extended from the stern to a bow to collect the movable rearbody, the movable rearbody is linked into the cavity portion by the hinge coupling device to sway upward and downward in the cavity portion with respect to the main hull, and an upper part of the cavity portion is preferably provided with a deck which is extended from the main hull to cover the rearbody.

A fourth object of the present invention is to provide an articulated ship hull structure, wherein two sides of the cavity portion for collecting the rearbody are further provided with side cabins which are extended downward from the stern portion of the main hull to cover two sides of the rearbody.

A fifth object of the present invention is to provide a method of operating an articulated, wherein when a ship which docks at a port or a pier sets to sail, the rearbody is lifted up by an ascending device to let part or entirety of the propellers be away from a water surface, so as to reduce a viscosity force in water. After the engines have been accelerated to a high rotation speed (RPM) in a short time, the propellers are put into water by the ascending device again, to increase propulsion, enabling the ship to quickly achieve a gliding speed. Next, during sailing, when facing pitching from waves, the rearbody will automatically sway upward and downward in accordance with the ascending and descending (swaying) of the main hull, with a hinge shaft as a pivot, by a buoyancy force of water and weight of the rearbody as well as the reaction force of water against the running propeller, so as to keep at a normal draught condition, thereby maintaining a best sailing state and being able to save fuel.

To enable a further understanding of the said objectives and the technological methods of the invention herein, the brief description of the drawings below is followed by the detailed description of the preferred embodiments.

DETAILED DESCRIPTION OF THE INVENTION

Figure 1:
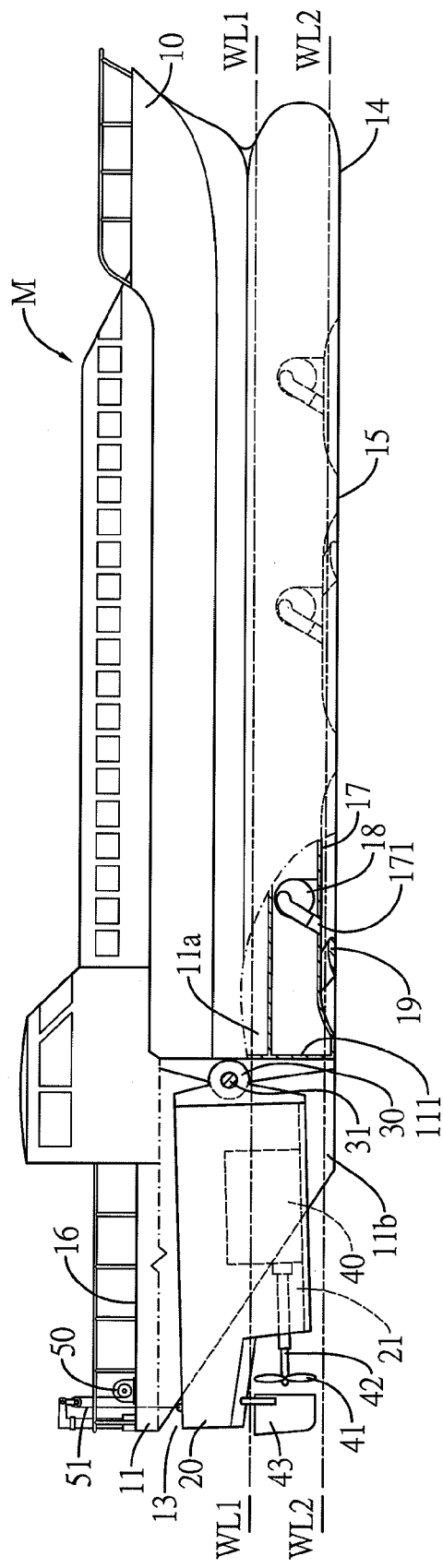
FIG. 1 shows a local cutaway side view of an embodiment of a ship hull structure of the present invention.
Figure 2:
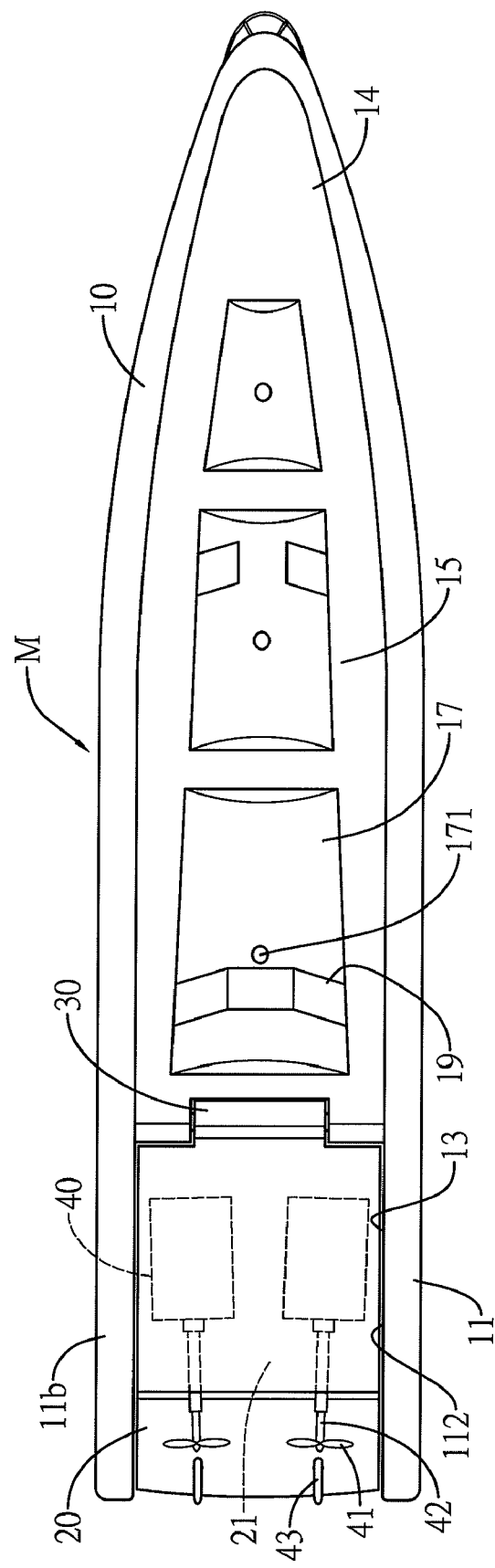
FIG. 2 shows a bottom view of the ship hull structure in FIG. 1.
Figure 3:
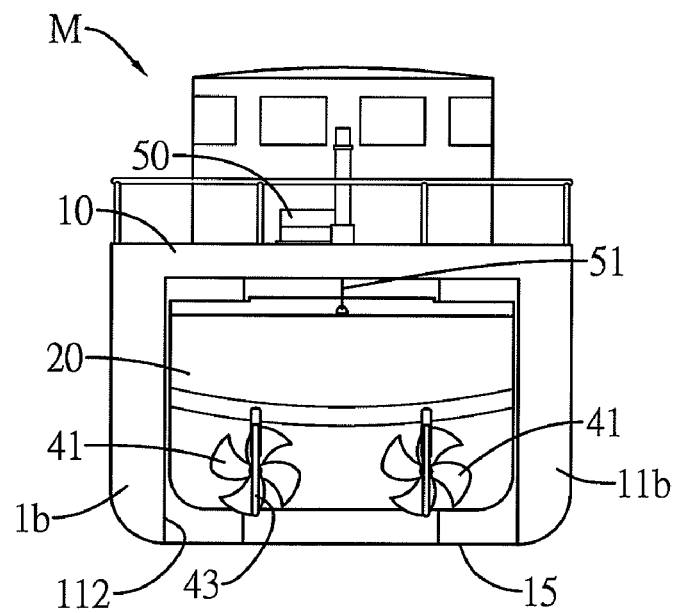
FIG. 3 shows an end view when seeing from a stern of the ship hull in FIG. 1.

FIG. 1 shows a side view of implementation configuration that a ship hull structure of the present invention is applied to a yacht, FIG. 2 shows a bottom view of the ship in FIG. 1, and FIG. 3 shows a schematic view of a stern of the ship in FIG. 1

Referring to FIGS. 1 to 3, a ship M of the present invention comprises a main hull 10 and a rearbody 20 which is connected at a stern portion 11 of the main hull 10 by a hinge coupling device (or briefly called a hinge device) 30 that the rearbody 20 can move upward and downward with respect to the main hull 10.

An interior of the main hull 10 is provided with cabins and refrigerators (not shown in the drawings) which are required in an ordinary ship. The stern portion 11 is formed with a cavity portion 13 which is extended from a stern end toward a bow. A close-end wall of this cavity portion 13 is a rear wall 111 of a stern cabin 11a, and two side walls are two opposite side walls 112 of two side cabins 11b, extended from the stern cabin 11a toward the stern. A bottom 14 of the main hull 10 is formed with a flat bottom portion 15.

Figure 5:
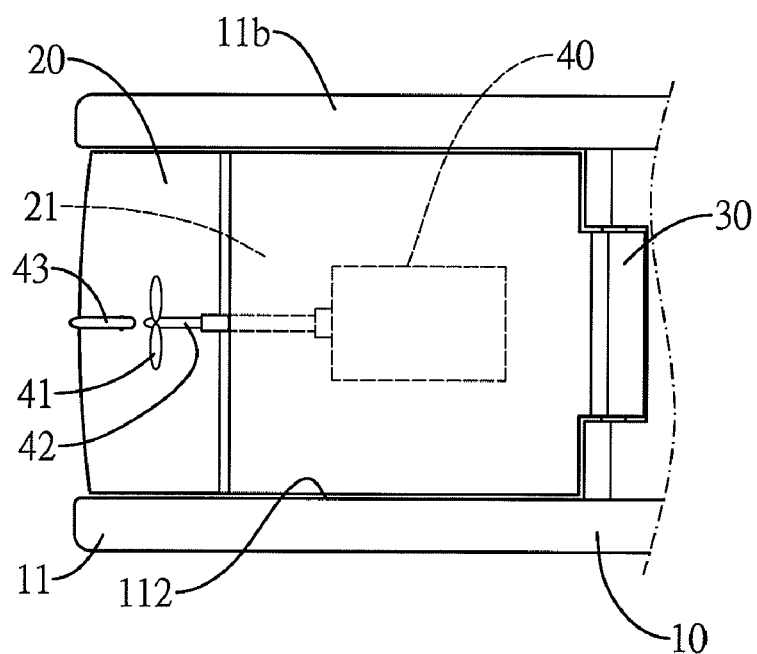
FIG. 5 shows a local schematic view of another embodiment of the ship hull structure of the present invention.

The rearbody 20 forms a body which can be collected in the aforementioned cavity portion 13 and is linked on the aforementioned rear wall 111 to connect with the main hull 10 into one integral unit by the hinge coupling device 30 that the rearbody 20 can sway upward and downward with respect to the main hull 10. An interior of the rearbody 20 is formed primarily with an engine room 21, inside which is provided with an engine 40. A propeller 41 is provided at a lower rear side of the stern by a propeller shaft 42 which is extended through a transmission mechanism (not shown in the drawings) from the engine 40 to a rear exterior side of the rearbody 20. In the embodiment of the drawings, the rearbody 20 is provided with a pair of engines 40 and a pair of propeller shafts 42 and propellers 41 which are left-right symmetric in the engine room 21. However, it should be realized that this kind of configuration is not fixed and it is also feasible if only one single engine 40, one single propeller shaft 42 and one single propeller 40 are configured in a center position of the engine room 21 (as shown in FIG. 5).

Figure 4:
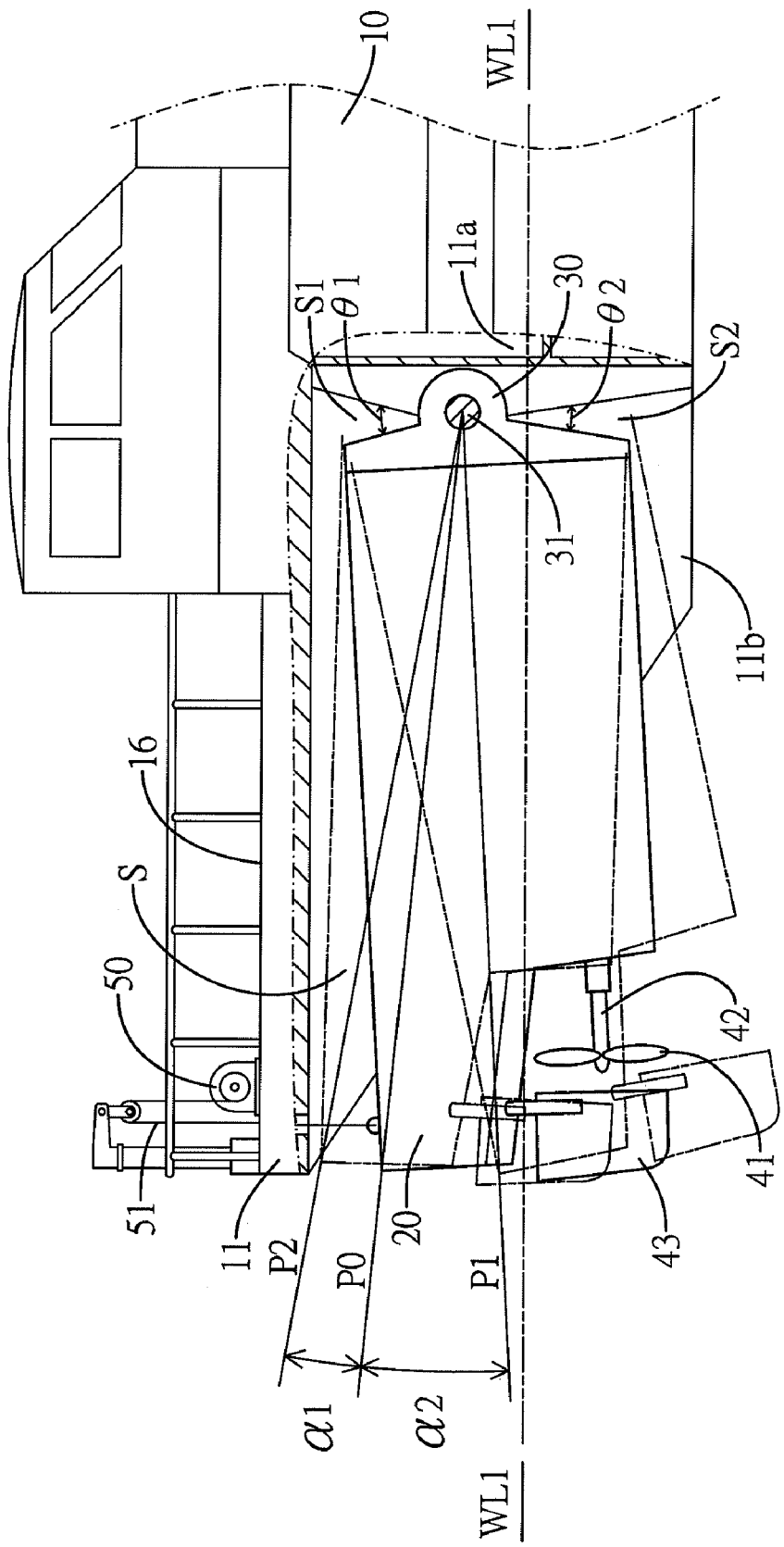
FIG. 4 shows a schematic view of a rearbody at various waterline heights.

At a lower rear side of the rearbody 20, there is a rudder 43 at a rear side of each propeller 41. To cover the rearbody 20 that the rearbody 20 will not be exposed outside as much as it can, a rear deck 16 of the main hull 10 can be extended to an upper side of the aforementioned cavity portion 13 to cover at least part of the rearbody 20. In terms of the embodiment of the ship as shown in FIG. 2, the deck 16 covers completely the top of the rearbody 20. Nevertheless, it is also feasible if only a front part of the rearbody 20 is covered or the rearbody 20 is not covered at all. To allow the rearbody 20 to move upward and downward with respect to the main hull 10, a space S is reserved between the rear deck 16 and the rearbody 20 for the rearbody 20 to pivot upward and downward between designated angles $\alpha 1$ and $\alpha 2$, with a hinge shaft 31 as a center (as shown in FIG. 4). Whereas, an upper and lower side of the hinge coupling device 30 that connects the main hull 10 and the rearbody 20 are also reserved with spaces S1, S2 for the rearbody 20 to pivot between designated angles $\theta 1$ and $\theta 2$ with the hinge shaft 31 as a center. In this embodiment, $\alpha 1 = \theta 1$, and $\alpha 2 = \theta 2$. If the pivot angles $\theta 1$, $\theta 2$ of the hinge are set to be equal, then the sway angles $\theta 1$, $\theta 2$ of the rearbody 20 will be equal, too. At this time, $\alpha 1 = \alpha 2 = \theta 1 = \theta 2$. However, $\theta 1$ and $\theta 2$ can be set to be non-equal, for example, $\alpha 1 < \alpha 2$ or $\alpha 1 > \alpha 2$, depending on designs. The hinge coupling device 30 can use any proper hinge coupling devices without specific limitations. Furthermore, the hinge device disclosed in U.S. Pat. No. 6,431,099 which has been issued to the present inventor, the hinge coupling device disclosed in U.S. Pat. No. 3,370,564 which has been issued to ARCHER et al., or the hinge coupling device disclosed in U.S. Pat. No. 3,145,681 which has been issued to NAKAGAWA, can be applied to the present invention, as well.

The two side cabins 11b of the cavity portion 13 at the rear side of the main hull 10 form roughly trapezoidal cabins which are extended in a tilted direction from the stern toward the bow under water. However, this shape is not fixed, as long as that the two side cabins 11b can cover two sides in front of the rearbody 20.

A proper position at a rear end of the rearbody 20, that is, a top center of the rearbody 20 in this embodiment, is connected to an end of a steel chain 51. The other end of the steel chain 51 is wound on a winch 50 which is provided on the deck 16. By driving and operating this winch 50 to roll up or release the steel chain 51, the rearbody 20 can stay at a desired height in a range of angle that the hinge device 30 can rotate. The aforementioned winch 50 can be operated manually or electrically and can be replaced by a chain block or a crane.

FIG. 4 shows a schematic view that the rearbody 20 stays at various heights by collecting and releasing the steel chain 51 with the winch 50.

When the steel chain 51 is hung down that the rear end of the rearbody 20 is at a position P0 which is at a height h above a waterline (WL1), the rearbody 20 can only sway in the water within the range of angle $\alpha 1$. On the other hand, if the steel chain 51 is hung down that the rear end of the rearbody 20 is at a position P1, then the rearbody 20 can sway within the angle $\alpha 1 + \alpha 2$. In addition, if the steel chain 51 is pulled up to a highest position or P2, then the rearbody 20 cannot sway.

In this embodiment, the rearbody 20 is designed as that the propeller 41 is submerged under water at the aforementioned position P0 by a buoyancy force, when the rearbody 20 is still in water. Therefore, even when the steel chain 51 is hung down to a length for the position P1, the rearbody 20 will still be at the position P0, and part of the steel chain 51 which exceeds the aforementioned height h will loosely stay on the rearbody 20. When the ship M sets to sail, the rearbody 20 can sway upward and downward within the angle $\alpha 1 + \alpha 2$, following pitching of the ship. Accordingly, by the adjustment of the length of the steel chain 51 and in association with the predetermined angle of the hinge device 30, the rearbody 20 can sway within the maximum angle $\alpha 1 + \alpha 2$.

Figure 6:
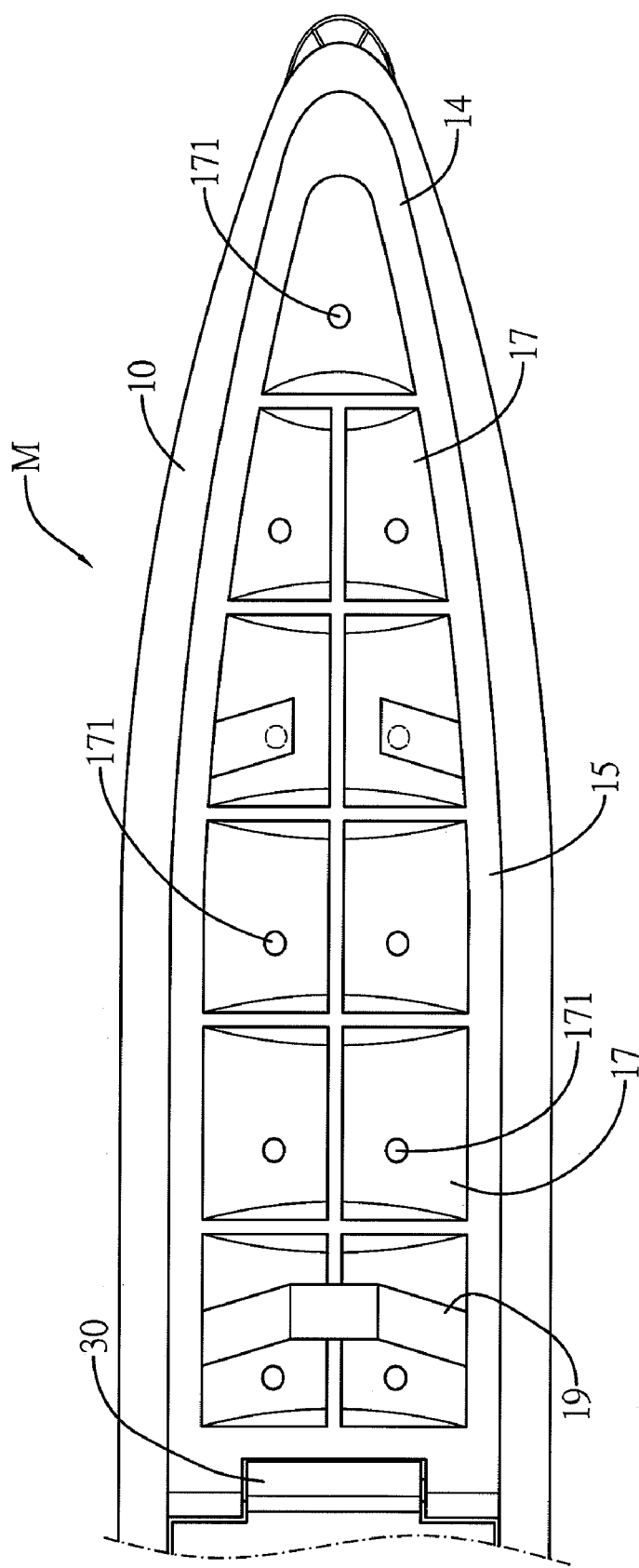
FIG. 6 shows a schematic view of an example that a bottom of the ship hull is formed with multiple rows of air cushion recesses.

Although the ship hull with the aforementioned structure can be applied to all kinds of ships, it is particularly suitable for a flatboat having partial or entirely flat bottom. For the ship M of the present embodiment, the main hull 10 is provided with the flat bottom portion 15 which is formed with at least one row of air cushion recesses 17 from the bow to the stern. A proper location in an interior of each air cushion recess 17 is provided with a blow hole 171 to blow out pressurized air which is transmitted from an air blower or an air compressor 18 in the main hull 10 to fill each recess 17. In addition, opening portions of at least part of the recesses 17 are provided with hydrofoils 19 to reduce viscosity between the ship bottom and a water surface and to facilitate the ship to glide on the water surface. The symbol WL2 in FIG. 1 represents a waterline when the ship M reaches to a gliding speed. In the present embodiment, each recess 17 is supplied with pressurized air by one independent air blower 18. However, it is also feasible if one large air blower (not shown in the drawings) is used to distribute pressurized air to each recess 17 through piping and pressure control valves. Moreover, if the ship is large, then it is preferred that the ship bottom 15 is provided with multiple rows of air cushion recesses 17, such as in FIG. 6.

On the other hand, a method of operating the ship with the aforementioned structure is disclosed hereinafter. When a ship docks at a port or pier, the ship is usually above the waterline (WL1). At this time, the rearbody 20 is at the position P0 under water where the propeller 41 is located. In this condition, when the engine 40 starts, as the propeller 41 is subjected to a larger resistant force of water, an RPM of the engine 40 will increase slowly, which consumes larger fuel. Yet, in the present invention, as the rearbody 20 can be pulled up through the steel chain 51 by the winch 50 until part or all of the propeller 41 leaves from the water surface to the position P2, for example, so as to reduce the resistance in the water. Hence, it is able to boost up the engine 40 to a desired high RPM in a short time. When the speed is achieved, the rearbody 20 is put down slowly that the propeller 41 can enter into the water, which gradually increases propulsion, thereby allowing the ship to navigate at the full speed or the desired speed and to achieve the gliding speed. During navigation, when being subjected to pitching of waves, the rearbody 20 can sway along with the main hull 10 and result in corresponding fluctuation by a buoyancy force of water and a weight of the rearbody 20 with the hinge shaft as the center; so as to keep at a normal draught condition, thereby maintaining a better navigation speed and a stable navigation state, as well as being able to save fuel significantly. In addition, in navigation, the pitching angle of the rearbody 20 can be changed by adjusting the length that the steel chain 51 is pulled down, within the range of angle defined by the hinge device 30.

For an ordinary ship, it is usually happens that the stern is tilted up, allowing the propeller to be completely out of water and suspended in air, due to pitching of the ship hull. At this time, as the propeller is not subjected to any water resistance, the propeller will be running idle in an extremely high speed. When the stern drops immediately and the propeller enters into the water again, the engine will suddenly decelerate by an abrupt loading of water resistance. As the engine is subjected alternately by this idle running and abrupt loading, a sudden change of rotation speed will result, which allows internal parts to be easily shocked or even damaged, thereby reducing the lifetime of usage to the engine. In addition, an unstable sailing speed of the ship can be induced, as well. As for the ship of the present invention, due to the rearbody 20 being capable of dropping down by gravity, the propeller 41 will not be suspended in air to run idle. Hence, there will be no sudden change of the rotation speed to the engine. Accordingly, the ship speed and navigation can be kept stable, the lifetime of usage to the engine can be extended, loss of horsepower can be reduced, and fuel can be saved.

Although the aforementioned ascending and descending of the rearbody 20 can be adjusted directly by manpower or by the remote winch 50, it can be done by automatic control with a microprocessor controller which controls the winch in association with startup, a rotation speed and an output condition of the engine. As this kind of microprocessor controller is a well-known technology in the related field, further description is not provided.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A ship hull structure comprising:
 a main hull having a stern portion;
 a movable rearbody having a rear end, and being pivotably connected with said stern portion of said main hull such that said movable rearbody is capable of moving up-and-down freely with respect to said main hull;
 a lifting device disposed on said stern portion of said main hull, and being configured and arranged to adjust a height of said rear end of said movable rearbody from a waterline and a pivot angle of said movable rearbody relative to said main hull;
 a power device comprising at least one engine; and
 a corresponding propeller, said power device and said corresponding propeller being provided on said movable rearbody,
 wherein a stern portion of said main hull forms a cavity portion extending from a stern to a bow and receiving said movable rearbody, said movable rearbody is connected to said main hull by a hinge coupling device so as to pivot up-and-down freely in said cavity portion with respect to said main hull, and an upper part of said cavity portion includes a deck extending from said main hull to partly or fully cover said movable rearbody.

2. The ship hull structure according to claim 1, wherein two side walls of said cavity portion are formed by two side cabins which extend downward from said stern portion of said main hull and surround at least part of two sides of said movable rearbody.

3. A ship hull structure comprising:
 a main hull having a stern portion;
 a movable rearbody having a rear end, and being pivotably connected with said stern portion of said main hull such that said movable rearbody is capable of moving up-and-down freely with respect to said main hull;
 a lifting device disposed on said stern portion of said main hull, and being configured and arranged to adjust a height of said rear end of said movable rearbody from a waterline and a pivot angle of said movable rearbody relative to said main hull;
 a power device comprising at least one engine; and
 a corresponding propeller, said power device and said corresponding propeller being provided on said movable rearbody,
 wherein said lifting device is a composite device of a winch, a block or a crane and a chain.

4. A method of operating an articulated ship having a ship hull structure including a main hull having a stern portion, a movable rearbody having a rear end, and being pivotably connected with the stem portion of the main hull such that the movable rearbody is capable of moving up-and-down freely with respect to the main hull, a lifting device disposed on the stem portion of the main hull, and being configured and arranged to adjust a height of the rear end of the movable rearbody from a waterline and a pivot angle of the movable rearbody relative to the main hull, a power device comprising at least one engine, and a corresponding propeller, the power device and the corresponding propeller being provided on the movable rearbody, said method comprising:

first using the lifting device to lift up the movable rearbody, allowing a part or an entirety of the corresponding propeller to be away from a water surface to reduce a viscosity force in water, when a stilled ship sets to sail;

next, after accelerating the at least one engine to a predetermined rotation speed, putting down the movable rearbody so as to put the corresponding propeller into water;

then, during sailing, automatically pivoting the moveable rearbody upward and downward relative to the main hull following pitching of waves, by a weight of the moveable rearbody and a buoyancy force of water, so as to keep the corresponding propeller at a predetermined draught condition; a pivot angle of the moveable rearbody capable of being adjusted any time when necessary, while in sailing.

5. The method according to claim 4, wherein when descending the moveable rearbody, a chain of the lifting device which suspends the moveable rearbody is released to a length such that the moveable rearbody pivots physically in a range of a pivot angle defined by the hinge device.

6. The method according to claim 4, wherein the lifting device is a composite device of a winch, a block or a crane and a chain.

* * * * *